United States Patent
Cai et al.

(10) Patent No.: US 9,036,800 B2
(45) Date of Patent: May 19, 2015

(54) BILLING FOR CALLS AND ROUTING OF BILLING INFORMATION IN AN INTERNET PROTOCOL MULTIMEDIA SUBSYSTEM

(75) Inventors: Yigang Cai, Naperville, IL (US); Chunguang Xu, Beijing (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1225 days.

(21) Appl. No.: 12/733,831

(22) PCT Filed: Sep. 26, 2007

(86) PCT No.: PCT/US2007/020752
§ 371 (c)(1),
(2), (4) Date: Jun. 21, 2010

(87) PCT Pub. No.: WO2009/041940
PCT Pub. Date: Apr. 2, 2009

(65) Prior Publication Data
US 2010/0290607 A1  Nov. 18, 2010

(51) Int. Cl.
*H04M 3/42* (2006.01)
*H04M 7/00* (2006.01)
*H04M 15/00* (2006.01)
*H04W 4/24* (2009.01)
*H04W 4/26* (2009.01)
*H04W 8/04* (2009.01)
*H04W 8/06* (2009.01)
*H04W 8/08* (2009.01)
*H04L 12/14* (2006.01)

(52) U.S. Cl.
CPC .............. *H04W 4/24* (2013.01); *H04L 12/1403* (2013.01); *H04L 12/1428* (2013.01); *H04M 15/00* (2013.01); *H04M 15/41* (2013.01); *H04M 15/51* (2013.01); *H04M 15/55* (2013.01); *H04M 15/57* (2013.01); *H04M 15/8038* (2013.01); *H04M 2215/0164* (2013.01); *H04M 2215/2046* (2013.01); *H04M 2215/208* (2013.01); *H04M 2215/54* (2013.01); *H04M 2215/7442* (2013.01)

(58) Field of Classification Search
USPC ............ 379/121.01, 405, 406, 432.1, 201.01, 379/201.02, 221.08; 455/405, 406, 432.1, 455/414.1, 432.2, 432.3, 433
See application file for complete search history.

(56) References Cited

U.S. PATENT DOCUMENTS 7,145,994 B2 *  12/2006  Moreau et al. ........... 379/114.01
7,181,193 B2 *  2/2007  Ansamaa ....................... 455/406
7,624,266 B2 *  11/2009  Gabor ........................... 713/168

(Continued)

*Primary Examiner* — Harry S Hong
(74) *Attorney, Agent, or Firm* — Carmen Patti Law Group, LLC

(57) ABSTRACT

An exemplary method implemented in a telecommunication network generates a charging data record (CDR) for a subscriber that is supported by a visited network while away from the subscriber's home network. A request is transmitted from a first node in the visited network for profile information about the subscriber to be obtained from the home subscriber server (HSS) in the subscriber's home network. A reply is received at the first node in the visited network in response to the request where the reply includes at least a portion of the profile information about the subscriber stored in the HSS of the subscriber's home network. The first node stores the at least portion of the profile information received in the reply, and generates the CDR associated with the subscriber as supported in the visited network where the CDR includes subscriber data derived from the stored at least portion of the profile information. The CDR is transmitted by the first node to another node in the telephony network to be used to determine billing associated with services provided to the subscriber.

8 Claims, 3 Drawing Sheets

(56) References Cited

U.S. PATENT DOCUMENTS

| | | |
|---|---|---|
| 2002/0068545 A1* | 6/2002 | Oyama et al. ............... 455/406 |
| 2004/0185826 A1 | 9/2004 | Koskinen et al. |
| 2005/0186939 A1 | 8/2005 | Barnea et al. |
| 2005/0240988 A1 | 10/2005 | Rajaniemi |
| 2006/0058006 A1 | 3/2006 | Hurtta et al. |
| 2006/0240822 A1* | 10/2006 | Jiang ........................... 455/433 |

\* cited by examiner

BILLING FOR CALLS AND ROUTING OF BILLING INFORMATION IN AN INTERNET PROTOCOL MULTIMEDIA SUBSYSTEM

BACKGROUND

This invention relates to billing information in an internet protocol multimedia subsystem (IMS) system and more specifically relates to charging data records (CDR) in an IMS system, information contained in these records, and the routing of the records.

Telephony systems have generated billing records related to each subscriber's account using CDRs. This has carried forward and is still used in newer systems, e.g. 3GPP and 3GPP2. For example in a 3GPP IMS system, network elements transmit session and event charging account request messages (ACR) to a charging data function (CDF) which in turn transmits this information to a billing system by way of a charging gateway function (CGF). However, the ACRs contain only limited subscriber data. Thus, service providers are required to process the CDR and rate the associated call based on the limited subscriber data contained in the ACRs. Service providers have a need for access to more complete subscriber data information while processing a CDR in order for the associated call to be rated/billed more precisely and for increased flexibility in billing.

SUMMARY

It is an object of the present invention to satisfy this need.

An exemplary method implemented in a telephony network generates a charging data record (CDR) for a subscriber that is supported by a visited network while away from the subscriber's home network. A request is transmitted from a first node in the visited network for profile information about the subscriber to be obtained from the home subscriber server (HSS) in the subscriber's home network. A reply is received at the first node in the visited network in response to the request where the reply includes at least a portion of the profile information about the subscriber stored in the HSS of the subscriber's home network. The first node stores the at least portion of the profile information received in the reply, and generates the CDR associated with the subscriber as supported in the visited network where the CDR includes subscriber data derived from the stored at least portion of the profile information. The CDR is transmitted by the first node to another node in the telephony network to be used to determine billing associated with services provided to the subscriber.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition that increased flexibility could be achieved in billing in an IMS system by providing access to more complete subscriber data at the time the CDR is being generated. In addition to improvements that can be made in the CDR itself, further benefits reside in the ability to better route the CDR. For example, a CDR generated for a call when the subscriber is not in his home network could be routed to the subscriber's home network, e.g. the subscriber's home CGF, where the address of the subscriber's home CGF is known at the time of the generation of the CDR in a visited network. As used herein a "call" means, with reference to IMS communications, at least one session where a completed communication between users may use a plurality of sessions.

Figure 1:
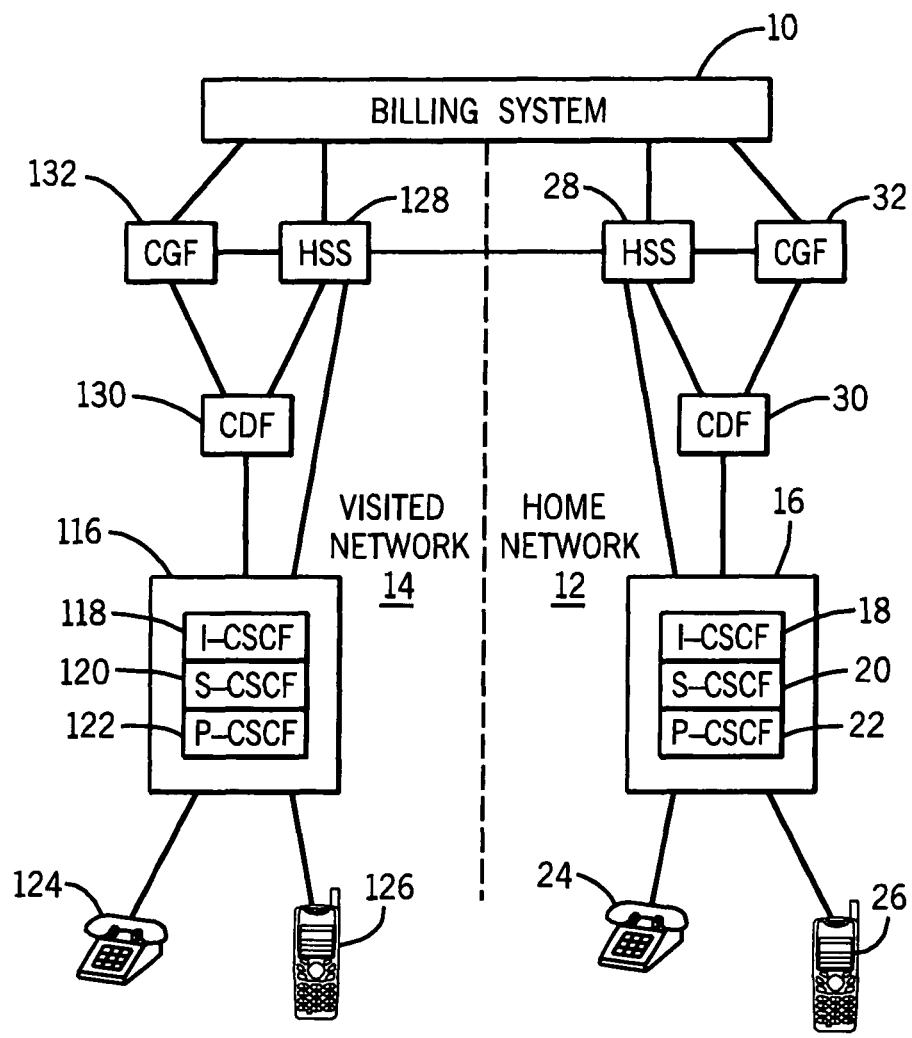
FIG. 1 is a block diagram of a portion of an IMS system that incorporates an embodiment of the present invention.

FIG. 1 illustrates a relevant portion of an IMS telecommunication system that includes a billing system 10 associated with a home network 12 and a visited network 14. In describing the IMS system, elements may be referred to as supporting identified functionality. It will be understood by those skilled in the art that this functionality is implemented by a corresponding apparatus or server.

The home network 12 includes a session manager 16 that includes an interrogating-call session control function (I-CSCF) 18, a serving call session control function (S-CSCF) 20 and a proxy call session control function (P-CSCF) 22. A wired telephone 24 and a wireless telephone 26 each have corresponding subscribers registered with the home subscriber server (HSS) 28. Telephones 24 and 26 are merely representative of a plurality of different types of telephones that subscribers may utilize. The session manager 16 is coupled to a charging data function (CDF) 30 that is coupled to HSS 28 and a charging gateway function (CGF) 32. Although only a single CDF 30 is shown, a CGF 32 may support a plurality of CDFs. The HSS 28 and the CGF 32 are each coupled to the billing system 10.

The visited network 14 is substantially identical in terms of architecture to that already described for home network 12. Elements in the visited network 14 that correspond to like elements in home network 12 are identified by reference numerals that are 100 greater than the corresponding reference numerals in the home network 12. Subscribers associated with telephones 124 and 126 have home registrations with HSS 128. Thus, if the subscriber associated with telephone 26 were physically within and served by the session manager 116 of visited network 14, then HSS 128 would serve the subscriber as a visiting HSS with his home HSS remaining HSS 28.

Another aspect of the present invention resides in a CDF-HSS Diameter Interface wherein subscriber data in the HSS is retrievable by the CDF, can be embedded into the generated CDR and can be utilized for routing of the CDR. Such an interface is not currently part of 3GPP or 3GPP2 standards. That is, it is believed that the current standards do not provide an interface between the visited CGF and the home network HSS, nor between the visited CDF and the home network HSS. In accordance with an embodiment of the present invention, the CDF and/or CGF can access subscriber information contained in a home network HSS and use such subscriber information in generating and routing a CDR. Certain retrieved subscriber data can be inserted into a CDR or utilized to generate other data that is inserted into a CDR. For example, the following subscriber information could be inserted into a CDR based on information retrieved from the HSS: operator identifier; charging/billing group identifier; handset identifier (equipment serial number, etc.); access network identifier; home CGF address; home billing domain identifier; current location information; local time zone information; charging class of services; alternative charging accounts; bonus redemption; rating specific keys; dual services indication; roam charging indication; foreign network charging indication; etc. The above list is intended to be exemplary and not inclusive of all subscriber data that could be obtained from an HSS or used for insertion into a CDR. The CDF, which may be implemented as server or intelligent node, will preferably contain a set of software-based rules that will determine the subscriber charging data derived from subscriber information retrieved from an HSS to be inserted into the CDR.

Figure 2:
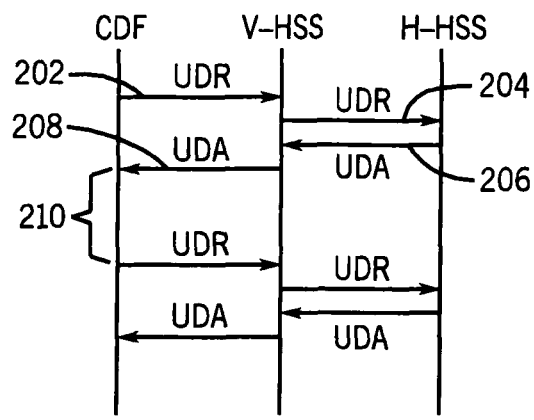
FIG. 2 is a signal flow chart illustrating an embodiment in accordance with the present invention by which a CDF is updated with changed subscriber data.
Figure 3:
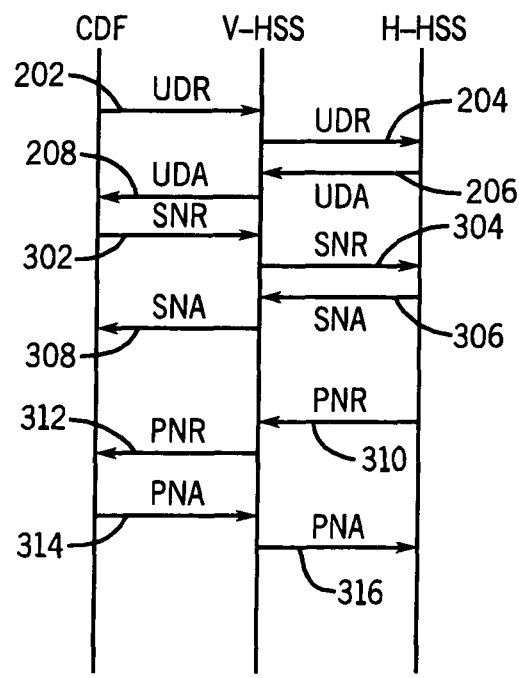
FIG. 3 is a signal flow chart illustrating another embodiment in accordance with the present invention by which a CDF is updated with changed subscriber data.
Figure 4:
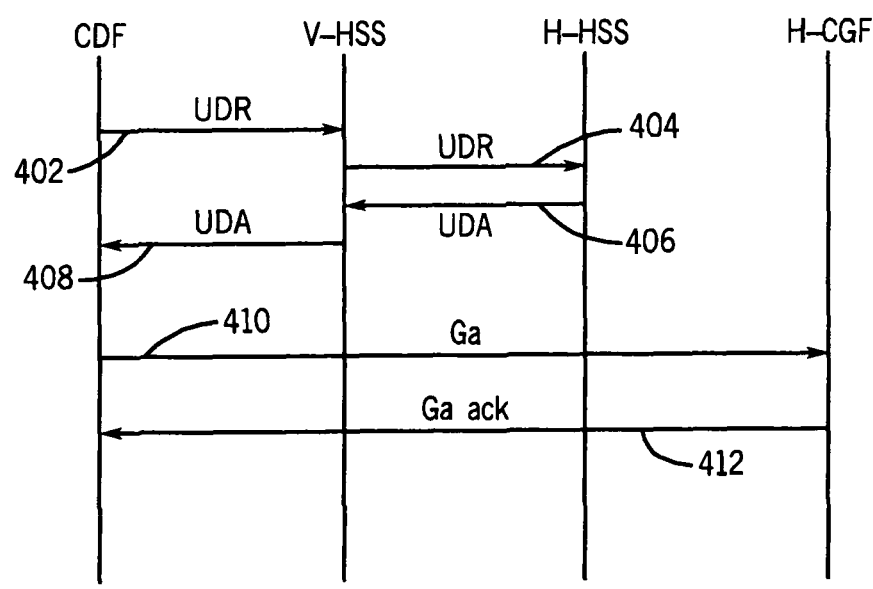
FIG. 4 is a signal flow chart illustrating an embodiment in accordance with the present invention in which a CDR generated in a visiting network is transmitted to the subscriber's home network prior to processing by the billing system.

In the signal flow examples of FIGS. 2-4, the following scenario applies. It is assumed that a subscriber, such as associated with wireless handset 26, is currently being served by the session manager 116 of visited network 14. In this situation the HSS 128 of the visited network functions as a visiting HSS for the call being handled for the subscriber of wireless handset 26, while HSS 28 functions as the home HSS. The CDF 130 of the visited network has responsibility for generating a CDR (call billing information) for this call. The CGF/CDF that generates the CDR may also retain a copy of this CDR for possible further use by the CGF/CDF.

FIG. 2 is a signal flow chart of an illustrative method for the retrieval and updating of subscriber profile data by the CDF responsible for generating a CDR for an associated call. The three nodes represented in FIG. 2 may illustratively comprise the following elements as shown in FIG. 1: CDF=CDF 130; V-HSS=HSS 128; H-HSS=HSS 28. The CDF transmits a user data request (UDR) 202 to the V-HSS which in turn generates another UDR 204 transmitted to the H-HSS. This UDR is interpreted by the H-HSS as a request for the transmission of all or a portion of the profile data of the subscriber. In response, the H-HSS accesses the specified subscriber profile data and transmits a user data answer (UDA) 206 containing the requested subscriber data to the requesting V-HSS which in turn is generates another UDA 208 transmitted to the requesting CDF. Thus, the CDF now has the subscriber profile data that can be stored locally and utilized for generating a CDR for a call engaged by the corresponding subscriber. This information may be obtained by the CDF upon the subscriber initially registering in the visited network 14 in anticipation of the generation of a CDR, or may be obtained by the CDF when a first CDR associated with subscriber is required. The home HSS, under the control of the home service provider and/or corresponding subscriber, will preferably have the ability to set limits on what parts of the subscriber profile will be made available for retrieval by a CDF/CGF. The bracket 210 represents a predetermined time interval monitored by the CDF. At the expiration of this time interval, CDF will seek to update the subscriber's profile data by a similar UDR/UDA message sequence. This update may obtain a complete subscriber data profile resulting in the CDF substituting the newest received profile for the corresponding profile that was locally stored. Alternatively, the update UDR may specify the date/time of the last update so that the H-HSS can determine the specific subscriber profile data that has changed so that only be changed profile data need be transmitted in the corresponding UDA.

This enables the CDF to insert into a CDR selective subscriber profile data locally stored by the CDF for the subject subscriber or to further process the locally stored subscriber profile data to generate information to be inserted into the CDR. Thus, a CDR can contain various information derivable only with reference to the subscriber profile data. This gives the service provider increased flexibility with regard to billing and accounting. In one embodiment the CDF/CGF that originates the CDR transmits the latter to the home CGF. In another embodiment the CDF/CGF that originates the CDR transmits the latter to a node, e.g. a third party server, revenue sharing server, customer care center, etc., where the identity/address of such a node is stored in the home HSS subscriber profile so that the originating CDF/CGF discerns this information upon retrieval of the subscriber's profile.

FIG. 3 is a signal flow chart of another exemplary method that is similar to FIG. 2, but in which updates of changed subscriber profile data are obtained by different process. The UDR/UDA message sequence 202, 204, 206 and 208 of FIG. 3 is the same as explained above with regard to FIG. 2. Following the initial receipt of the subscriber profile data, the CDF generates and transmits a subscriber notification request (SNR) 302 to the V-HSS which in turn transmits SNR 304 to the H-HSS. The H-HSS interprets this request as an instruction to automatically transmit, i.e. "push", any changes to the subject subscriber profile data to the requesting CDF. The H-HSS generates and transmits a subscriber notification answer (SNA) 306 to the V-HSS which in turn transmits SNA 308 to the CDF acknowledging receipt of the SNR. In an alternate embodiment the UDR and SNR messages can be combined into a single message, e.g. SNR 1 (not shown), with a corresponding SNA 1 carrying the information of the illustrated UDA and SNA.

Upon a change in the subject subscriber profile data contained in the H-HSS, the latter will automatically generate and transmit a profile notification request (PNR) 310 the V-HSS which will in turn transmit PNR 312 to the CDF. The PNR will contain either a complete subscriber profile data record or only be changed data for a subject subscriber. The CDF will use this updated data to refresh and revise the locally stored subscriber profile data so that it has the current data profile stored in the H-HSS. The CDF transmits an acknowledgment as a profile notification answer (PNA) 314 to the V-HSS which in turn transmits PNA 316 to the H-HSS. Thus, the locally stored subscriber profile data at the CDF is automatically updated by the H-HSS pushing any changes as occur to the CDF.

FIG. 4 is a signal flow chart of another illustrative method in which the CDF responsible for generating a CDR is enabled with information that permits the CDF to transmit the CDR associated with a visiting subscriber to the subscriber's home CGF (H-CGF). In addition to the above-described scenario with regard to FIG. 1, CGF 132 functions as a visiting CGF and the CGF 32 serves as the subscriber's home CGF which is part of the home network 12 of the subscriber associated with wireless handset 26. The UDR/UDA message sequence (402, 404, 406, 408) is substantially the same as described in the above signal flow charts except that the UDA messages also contain the subscriber's home CGF address. This address information is either available in the H-HSS or can be determined by the latter. This address information is also locally stored by the visiting CDF along with the corresponding subscriber's profile data.

The CDF that supports the visiting subscriber in the visited network 14 will be required to generate a CDR associated with a call by the visiting subscriber. Normally, the CDF 130 (visiting CDF) would transmit the generated CDR to its CGF 132 for further processing and routing. However, in accordance with this embodiment of the present invention, the visiting CDF 130 will generate the corresponding CDR for the visiting subscriber and will transmit the CDR, indicated as Ga 410, to the subscriber's home CGF 32 based on the locally stored address of the home CGF 32 of this visiting subscriber. The H-CGF 32 responds by transmitting an acknowledgment, Ga ack. 412, that to the CDF from which the CDR was received. This enables the home CGF to correlate all CDRs associated with the subscriber originated from different IMS networks, and it desired, consolidate all CDRs for a given subscriber before passing the consolidated CDR for further processing by the billing system. This gives the network provider increased visibility with regard to charges being incurred by a subscriber. It will also simplify the processing of CDRs required of the billing system since all, or at least a substantial number of, CDRs will have been identified and integrated together with regard to a subscriber, thereby eliminating or reducing the billing system function of searching and collecting related CDRs.

The different network nodes (elements) shown in FIGS. 1-4 may be implemented by a server or other computing apparatus operating under stored program control instructions such as contained in software. The hardware may include a microprocessor supported by read-only memory, random access memory, and nonvolatile storage such as provided by hard drive. An input/output module may be connected to the microprocessor to support the transmission and reception of messages and data with external nodes. Various known user input (keyboard, mouse, etc.) and output (monitor, etc.) devices may be utilized to facilitate control and operation of the node. Internal communications among these elements within a node may be supported by a known operating system. As will be understood by those skilled in the art, one or more application programs that is supported by the operating system will be utilized to provide control instructions causing the node to implement the required functionality as explained above and shown in the figures.

Although exemplary implementations of the invention have been depicted and described in detail herein, it will be apparent to those skilled in the art that various modifications, additions, substitutions, and the like can be made without departing from the spirit of the invention. For example, the functions performed by a network node may be incorporated into another node. Although FIGS. 2-4 depict the visiting CDF node as acquiring and locally storing subscriber profile data obtained from the home HSS of the subscriber, the visiting CGF node may be utilized to implement this functionality. Depending upon the network architecture and number of the supported subscribers, the functionality described for the CDF and CGF may be integrated into a single node. Depending on network design, the home CDF and/or home CGF can also be configured to access, retrieve and locally store the subscriber profile that resides in the home HSS in order to generate more detailed CDRs in the same manner as the visiting CDF/CGF.

The scope of the invention is defined in the following claims.

We claim:

1. A method implemented in a telephony network for generating a charging data record (CDR) for a subscriber that is supported by a visited network while away from the subscriber's home network comprising the steps of:

transmitting a request from a first node in the visited network for profile information about the subscriber where the request seeks the profile information stored in a home subscriber server (HSS) in the subscriber's home network;

receiving a reply at the first node in the visited network in response to the request where the reply includes all of the profile information about the subscriber stored in the HSS of the subscriber's home network;

storing by the first node the profile information received in the reply;

generating by the first node the CDR associated with the subscriber as supported in the visited network where the CDR includes subscriber data derived from the stored profile information;

transmitting the CDR by the first node to another node in the telephony network to be used to determine billing associated with services provided to the subscriber.

2. The method of claim 1 wherein the step of transmitting the request from the first node comprises transmitting the request from a charging data function node in the visited network, the visited network comprising an internet protocol multimedia subsystem telecommunication system.

3. The method of claim 1 wherein the step of receiving the reply includes receiving an address of a second node in the home network of the subscriber to which the CDR is to be transmitted from the first node.

4. The method of claim 3 wherein the second node comprises a charging gateway function node.

5. A method implemented in a telephony network for generating a charging data record (CDR) for a subscriber that is supported by a visited network while away from the subscriber's home network comprising the steps of:

transmitting a request from a first node in the visited network for profile information about the subscriber where the request seeks the profile information stored in a home subscriber server (HSS) in the subscriber's home network;

receiving a reply at the first node in the visited network in response to the request where the reply includes all of the profile information about the subscriber stored in the HSS of the subscriber's home network;

storing by the first node the profile information received in the reply;

generating by the first node the CDR associated with the subscriber as supported in the visited network where the CDR includes subscriber data derived from the stored profile information;

transmitting the CDR by the first node to another node in the telephony network to be used to determine billing associated with services provided to the subscriber, wherein the step of transmitting the CDR comprises transmitting the CDR to an HSS of the visited network that functions as a visiting HSS for the subscriber served by the visited network, and the visiting HSS forwarding the request to the HSS in the subscriber's home network.

6. The method of claim 5 wherein the step of transmitting the request from the first node comprises transmitting the request from a charging data function node in the visited network, the visited network comprising an internet protocol multimedia subsystem telecommunication system.

7. The method of claim 5 wherein the step of receiving the reply includes receiving an address of a second node in the home network of the subscriber to which the CDR is to be transmitted from the first node.

8. The method of claim 7 wherein the second node comprises a charging gateway function node.

* * * * *